(12) United States Patent
Schneider et al.

(10) Patent No.: US 12,485,599 B2
(45) Date of Patent: Dec. 2, 2025

(54) DEVICE FOR PRODUCING AND FILLING CONTAINER PRODUCTS

(71) Applicant: KOCHER-PLASTIK MASCHINENBAU GMBH, Sulzbach-Laufen (DE)

(72) Inventors: Sven Schneider, Abstgmünd (DE); Dmitri Kirchmaier, Obersontheim (DE); Markus Mayr, Gaildorf (DE)

(73) Assignee: KOCHER-PLASTIK MASCHINENBAU GMBH, Sulzbach/Laufen (DE)

( * ) Notice: Subject to any disclaimer, the term of this patent is extended or adjusted under 35 U.S.C. 154(b) by 908 days.

(21) Appl. No.: 16/648,371

(22) PCT Filed: Sep. 6, 2018

(86) PCT No.: PCT/EP2018/073958
§ 371 (c)(1),
(2) Date: Mar. 18, 2020

(87) PCT Pub. No.: WO2019/057502
PCT Pub. Date: Mar. 28, 2019

(65) Prior Publication Data
US 2020/0230860 A1    Jul. 23, 2020

(30) Foreign Application Priority Data
Sep. 20, 2017    (DE) .................. 10 2017 008 803.9

(51) Int. Cl.
*B29C 48/76* (2019.01)
*B29C 48/00* (2019.01)
(Continued)

(52) U.S. Cl.
CPC ........ *B29C 48/765* (2019.02); *B29C 48/0017* (2019.02); *B29C 48/08* (2019.02);
(Continued)

(58) Field of Classification Search
CPC ... B29C 48/765; B29C 48/0017; B29C 48/08; B29C 49/46; B29C 49/04
See application file for complete search history.

(56) References Cited

U.S. PATENT DOCUMENTS 3,251,915 A    5/1966   Pechthold
4,244,913 A *   1/1981   Ryder ................ B29C 49/66
                                                 264/28
(Continued)

FOREIGN PATENT DOCUMENTS

DE    1 180 301    7/1961
DE    1 479 698    5/1969
(Continued)

OTHER PUBLICATIONS

Gerhard et al., DE 2134166 A, Machine Translation, Jan. 1973 (Year: 1973).*

(Continued)

*Primary Examiner* — Timothy Kennedy
(74) *Attorney, Agent, or Firm* — Wenderoth, Lind & Ponack, L.L.P.

(57) ABSTRACT

In a device for producing and filling container products, at least one hose (19) of plasticized plastic material can be extruded into an opened mold (7), starting from an extrusion head (13) along a hose guide. By at least one filling mandrel (1), which at least in one functional position extends through the extrusion head (13), a filling material can be introduced into the relevant container. At least one process gas feeder device (21, 23) can be used to bring a process gas into the interior of the hose (19). The process gas feeder device (21, 23) has a guide duct (21) extending inside the extrusion head (13) along the outside of the filling mandrel (1). At least part of the process gas introduced is discharged through the extrusion head (13) along at least one predeterminable (Continued)

exhaust gas duct (35), which is separated from the relevant guide duct (21).

19 Claims, 4 Drawing Sheets

(51) Int. Cl.
    *B29C 48/08*     (2019.01)
    *B29C 49/04*     (2006.01)
    *B29C 49/46*     (2006.01)
    *B65B 9/24*     (2006.01)

(52) U.S. Cl.
    CPC .............. *B29C 49/04* (2013.01); *B29C 49/46* (2013.01); *B65B 9/24* (2013.01); *B29C 2049/4664* (2013.01)

(56) References Cited

U.S. PATENT DOCUMENTS

| | | | | |
|---|---|---|---|---|
| 4,784,697 A | * | 11/1988 | Bordini | B67C 3/002 53/551 |
| 4,968,539 A | | 11/1990 | Hansen | |
| 5,335,479 A | * | 8/1994 | Lemke | B65B 9/213 53/551 |
| 5,862,840 A | * | 1/1999 | Hansen | B67C 7/0073 141/90 |
| 6,074,596 A | * | 6/2000 | Jacquet | B29C 49/541 425/530 |
| 2016/0023785 A1 | | 1/2016 | Clusserath | |

FOREIGN PATENT DOCUMENTS

| | | | | |
|---|---|---|---|---|
| DE | 2 134 166 | | 1/1973 | |
| DE | 10 2013 101 775 | | 8/2014 | |
| EP | 0 361 123 | | 4/1990 | |
| EP | 1258336 A1 | * | 11/2002 | ............... A61L 2/04 |
| JP | 2013-132861 | | 7/2013 | |
| WO | 2009/152979 | | 12/2009 | |

OTHER PUBLICATIONS

Hansen, WO 2009/152979 A1, Machine Translation, Dec. 2009 (Year: 2009).*

International Search Report (ISR) issued Nov. 6, 2018 in International (PCT) Application No. PCT/EP2018/073958.

* cited by examiner

DEVICE FOR PRODUCING AND FILLING CONTAINER PRODUCTS

FIELD OF THE INVENTION

The invention relates to a device for producing and filling container products.

BACKGROUND OF THE INVENTION

Devices of this type are state of the art. WO 2009/152979 discloses a device operating in accordance with the well-known Bottelpack® system, which permits automated forming (blowing or vacuum forming), filling and closing of containers in an economical way. If sensitive products, for instance pharmaceuticals, are to be filled into the above-mentioned containers, the international standards for aseptic packaging must be met. In order to meet these standards, the process gas used as supporting air, which is introduced into the interior of the hose to stabilize the guide of the free hose section between the extrusion head and the mold, is sterile air. A sterile filling chamber (ASR) is then formed, in which chamber the sterile air forms an effective protection against the penetration of germs, until after completion of the filling process and closing mold parts of the mold to form the desired head closure of the container using a combined vacuum welding process.

DE 1 479 698 describes a device for producing and filling container products, in which at least one hose of plasticized plastic material can be extruded into an opened mold starting from an extrusion head along a hose guide. By least one filling mandrel, which extends through the extrusion head in at least one functional position, a filling material can be introduced into the relevant container. At least one process gas feeder device can be used to bring process gas into the interior of the hose. The process gas feeder device within the extrusion head has a guide duct extending along the outside of the filling mandrel.

A further device of this type is shown in DE 1 180 301.

SUMMARY OF THE INVENTION

Based on this state of the art, the invention addresses the problem of providing an advantageous device of the aforementioned type, which can be used in a particularly safe and economical manner for the manufacture of containers for pharmaceutical or diagnostic purposes and which, in accordance with the official regulations, permits an at least partially continuous and representative measurement of the required clean room class of the hose interior near a filling position.

According to the invention, this problem is solved by a device having, as an essential characteristic of the invention, at least part of the additionally introduced process gas discharged through the extrusion head starting from the interior of the hose along at least one predeterminable exhaust gas duct. The exhaust gas is separated from the relevant process gas feed. Without having to interrupt the manufacturing process of the device, a quantity of test gas originating from the space inside the hose is available via the exhaust gas duct, which test can be analyzed, for instance, to prove compliance with the specifications regarding cleanroom class, residual oxygen content or the like. Sterile air, or for instance for oxygen-sensitive products, an inert gas such as nitrogen or argon can be used as a process gas.

The presence of the exhaust gas duct provides the option of providing at least one further device feeding process gas. Additional process gas then can be brought into the interior of the hose, preferably close to the inner surface of the hose, via at least one further process gas feed. In this way, a substantially increased quantity of gas can be introduced into the hose-compared to just the supporting air according to the state of the art. Thus, a particularly effective regulation for stabilizing the hose forming and guide is feasible. In addition, the temperature of the process gas can be controlled to have a direct influence on the temperature of the inside of the hose. Furthermore, the flow profile inside the hose can be adjusted by selecting the flow rate and flow velocity of the process gas. If additional process gas is introduced, it is advantageous to have at least one additional exhaust gas duct, by which process gas can be discharged in addition to the analysis quantity.

The arrangement can be advantageously made such that at least in part the number of exhaust gas ducts used is greater than the number of process gas feeds by at least one increment.

Advantageously, a vacuum-generating device can be connected to at least one of the exhaust gas ducts, which vacuum-generating device permits the regulated extraction of process gas to an optimum extent for stabilizing the hose forming and guide, as well as supplying constant, regulated gas quantities to the gas analyzers, particle counters, etc.

In particularly advantageous exemplary embodiments, one process gas feed extends at least partially between the relevant filling mandrel and a support housing, in which the filling mandrel is guided in a longitudinally movable manner. Parts of this one process gas feed pass into branching functional ducts extending in the support housing to block the entry of potentially impure ambient air into the process gas feed, and thus, into the interior of the hose.

The arrangement can be advantageously made in such a way that at least one free end of one exhaust gas duct, which is provided for purposes of physical and/or chemical analysis, opens into a branch chamber in the extrusion head. The extrusion head is penetrated by the filling pin. Into the branch chamber at least the process gas from the inside of the hose penetrates.

Preferably, one free end of the further process gas feed opens into the branch chamber on the side opposite from the side on which one of the exhaust gas ducts opens into the branch chamber. At least one further process gas feed can open laterally into the branch chamber.

In addition, at least one of the exhaust gas ducts may preferably be connected to the regulable, vacuum-generating device and open into the branch chamber laterally and in parallel to the one further process gas feed.

Advantageously at least one exhaust gas duct can open into the inside of the hose and can pass through the extrusion head in a duct-shaped manner and be arranged in parallel to the filling mandrel.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
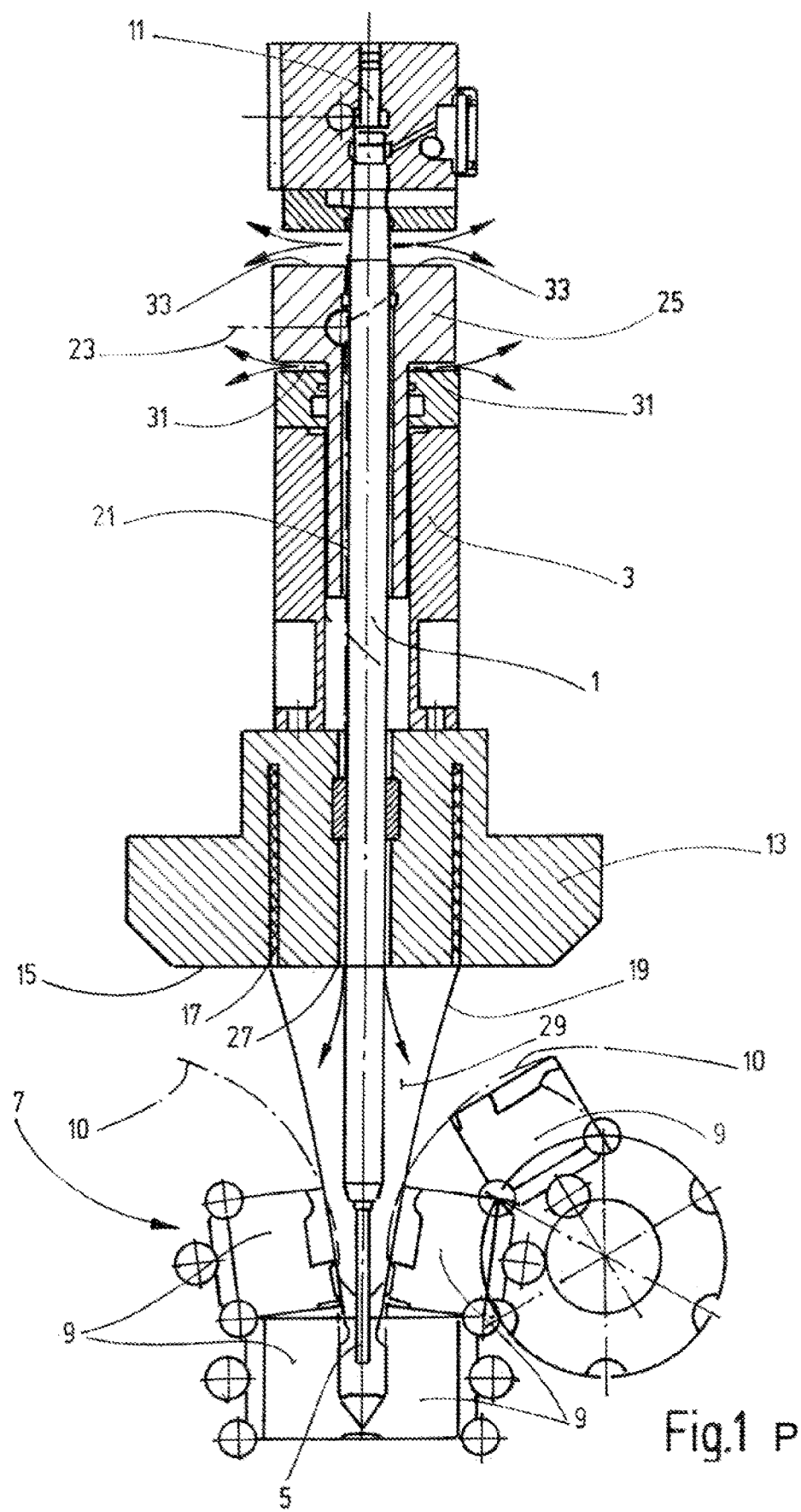
FIG. 1 is a side view in section of a part of a device operating in accordance with the Bottelpack® system according to the state of the art, wherein only the area of the filling mandrels is shown, the filling needle-shaped ends of the only visible mandrel extend into a mold having movable mold parts.

FIG. 1 shows a device part of a known device for producing and filling container products by blow or vacuum forming, which essentially corresponds to the device part as shown in FIG. 5 of WO 2009/152 979 A1 mentioned in the state of the art. As in this figure, only one single filling mandrel 1 of a plurality of filling devices arranged in a row perpendicular to the drawing plane is visible. The filling mandrel is mounted in a support housing 3 in the manner customary for such devices to be moved in a controlled manner into various selected operating positions. FIG. 1 shows the visible filling mandrel 1 in an extended operating position for a filling process. The filling-needle-shaped tapered end section 5 is extended into a form 7, which is not yet closed at the head end. In a kind of carousel arrangement, individual mold parts 9 are moved towards each other in pairs on a fictitious circular arc path 10 to form a closed manufacturing mold, and are moved apart again to open the mold. Every filling mandrel 1 has a centrally located filling duct 11 for a metered dosing of filling material from the end section 5. In the manner usual for such devices, the filling ducts 11 can be supplied with controlled dose units of the product to be filled from a central filling material pipe (not shown).

An extrusion head 13, often also referred to as a hose head, is mounted on the support housing 3, which has an annular extrusion nozzle 17 on its end face 15 in a manner known per se. A hose 19 emerges from extrusion nozzle 17 during operation, which hose is formed from plasticized plastic material fed into the extrusion head 13 from an extruder device (not shown). Because such extruder devices and the design of the extrusion head 13, are known per se, for instance in the form of devices operating according to the Bottelpack® process, no further explanations of the details to this effect are required.

A process gas feeder device or supporting air device is provided in the known manner to stabilize the free hose forming and guide along the hose 19 from the extrusion nozzle 17 into the form 7. It has a guide duct 21 extending inside the support housing 3 and the extrusion head 13 along the outside of the filling mandrel 1. The guide duct 21, starting from an inlet 23, which is located on a sleeve-shaped end part 25 of the support housing 3, extends along the outside of the relevant filling mandrel 1 to an outlet orifice 27 on the end face 15 of the extrusion head 13. Based on the inflow of sterile process gas or sterile supporting air into the interior of the hose 19 via the outlet opening 27, which along its course from the extrusion head 13 into the mold 7, forms a closed space 29. The interior of the hose forms the sterile filling space, inside which the entire production process is performed, i.e. up to the closing of the head of the filled container, which is performed by closing the relevant head jaws of the mold 7. As the corresponding mechanisms of the mold 7 are known per se, the drawing shows the mold 7 merely as a simplified schematic, i.e. without a separate representation of main mold parts and head mold parts. To shield the guide duct 21 against the ingress of ambient air, the end part 25 of the support housing is provided with 3 transverse function ducts 31, which are connected to the guide duct 21. Through the guide duct 21, supporting air or process gas can disperse freely. Additional free dispersing ducts 33 for process gas are provided at the outer end of the end part 25 of the support housing 3.

The gas chamber 29 within the hose 19 is not accessible for analytical purposes. In addition, the great length of the process gas feeding duct 21 and the low process gas or supporting air volume flows render a precise and reliable control of the hose design for production difficult.

Figure 2:
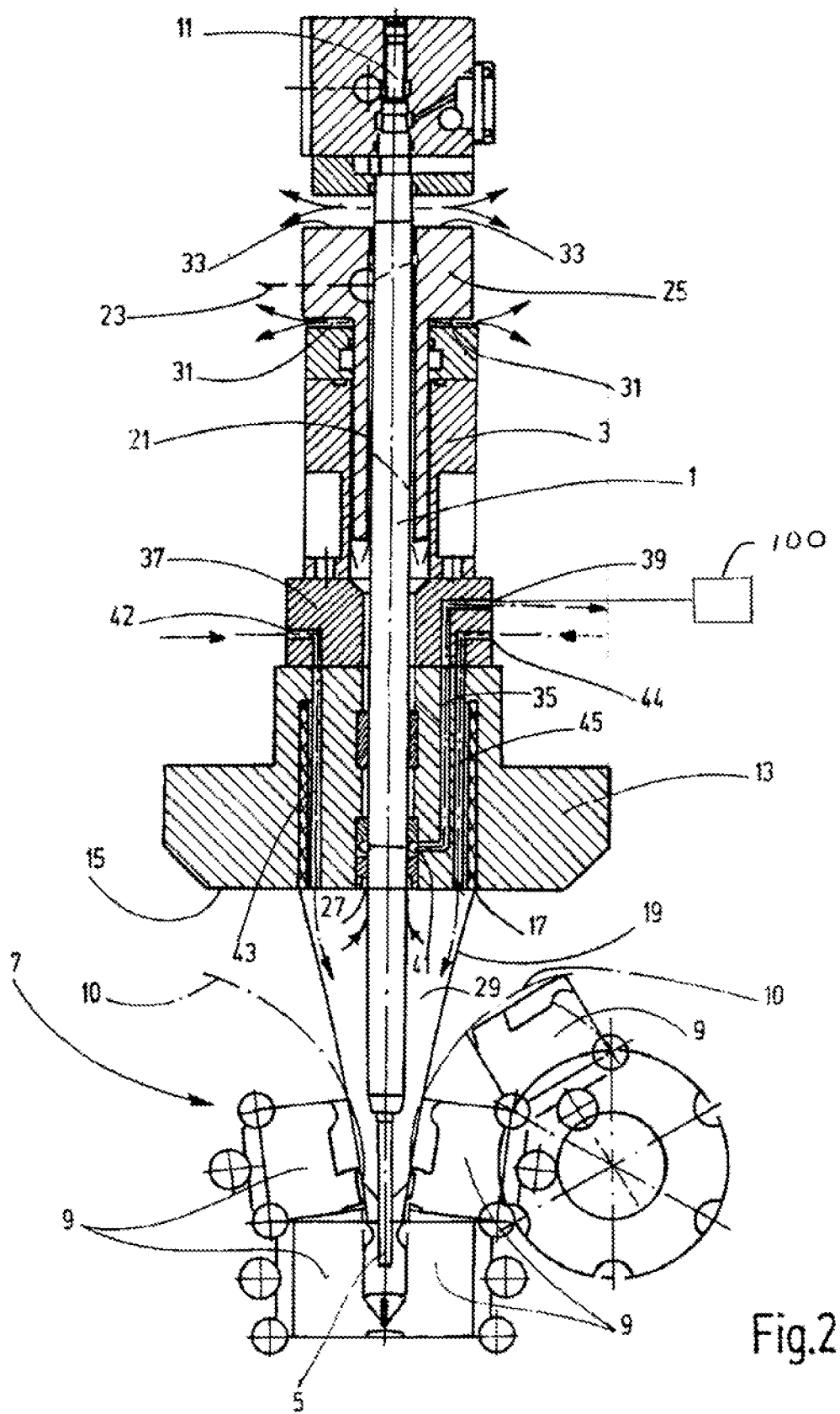
FIG. 2 is a side view in section of a device according to a first exemplary embodiment of the invention.
Figure 3:
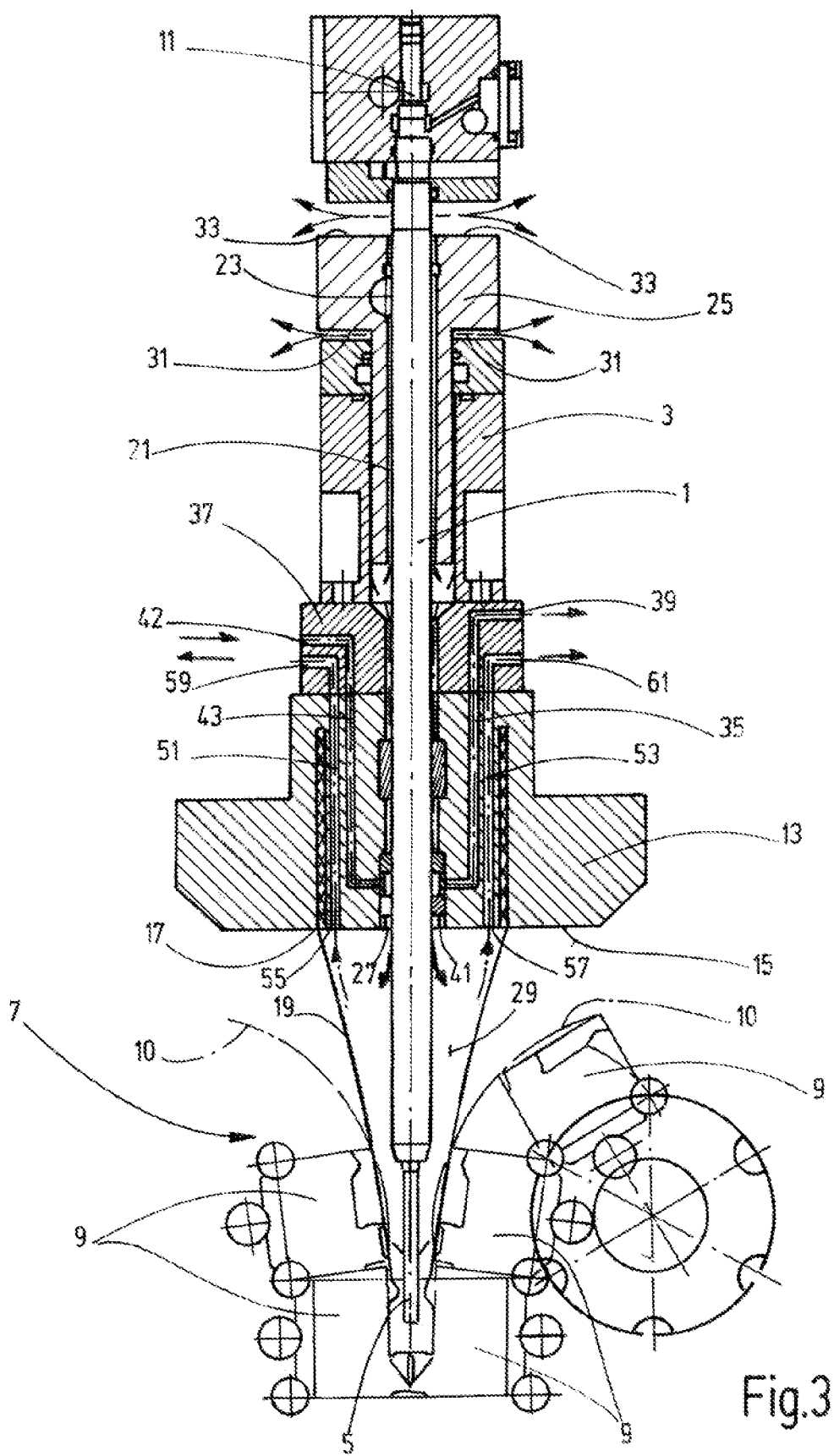
FIGS. 3 and 4 are side views in section of devices according to second and third exemplary embodiments, respectively, of the invention.
Figure 4:
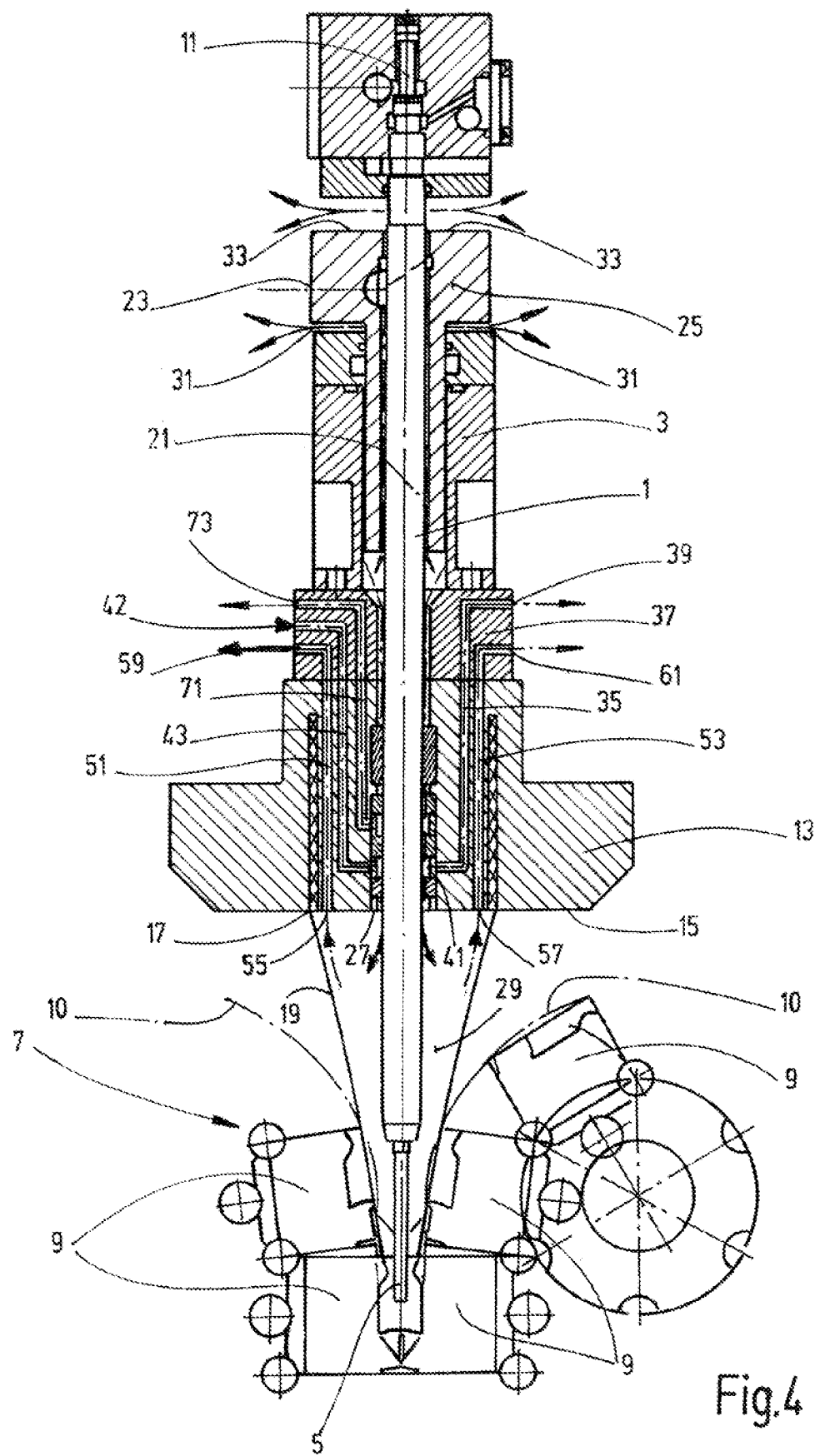

FIGS. 2 to 4 show exemplary embodiments of the device according to the invention. These have additional short inlets and/or outlets for pure, sterile process gas and branch chambers in the extrusion head, and thus, in close proximity to the inner wall of the hose. The first exemplary embodiment of FIG. 2 differs from the state of the art as shown in FIG. 1 in that, on the one hand, an exhaust gas duct 35 is additionally provided. Exhaust gas duct 35 extends for a large part of its length in parallel to the filling mandrel 1 within the extrusion head 13 and the adjoining section 37 of the support housing 3. One exhaust gas outlet 39 exits from the section 37 and opens into a branch chamber 41 in the extrusion head 13 on the inlet side. On the other hand, the example of FIG. 2 differs from the state of the art by the presence of two further process gas feeds 43 and 45, which extend from the process gas inlets 42 and 44, respectively, in parallel to the filling mandrel 1, through the extrusion head 13 and open into the inner chamber 29 of the hose 19, closely adjacent to the extrusion nozzle 17. Based on a regulated introduction of the additional process gas flows, a representative quantity of gas from the chamber 29 penetrates into the branch chamber 41 and from there into the exhaust gas duct 35 and can then be removed at its exhaust gas outlet 39. During operation of the device, a gas quantity (sample gas) having a representative composition is continuously available and can be extracted for the analysis purposes, for instance, to prove that the device meets the required purity class, or, for instance for oxygen-sensitive filling goods, the residual oxygen concentration in the hose is sufficiently low. A suitable controllable vacuum-generating device or vacuum generator and/or measuring device 100 for the purpose of physical and/or chemical analyses, for instance a particle counter, can be connected to the exhaust gas outlet 39.

FIG. 3 shows a second exemplary embodiment of the device according to the invention. It differs from the example in FIG. 2 in that two additional exhaust gas ducts 51 and 53 are provided, which, starting from an orifice 55 and 57, respectively, are located on the end face 15 of the extrusion head 13 closely adjacent to the extrusion nozzle 17 and extend in parallel to the filling mandrel 1 to the exhaust gas outlets 59 and 61, respectively, at the housing section 37. As in the example of FIG. 2, an additional process gas feed 43 is provided, which starts from the process gas inlet 42 and whose main part extends in the extrusion head 13 in parallel to the filling mandrel 1. A further difference, for instance from FIG. 2, is that the additional process gas duct 43 is not routed directly into the interior 29 in the hose 19, but opens into the branch chamber 41 on the side opposite from the side into which the exhaust gas duct 35 opens. One part of the sterile process gas passes from the branch chamber 41 into the interior 29 of the hose 19, while another part flows into the guide duct 21, and thus, acts as a barrier against potential impurities from the parts of the device located above the branch chamber 41.

FIG. 4 shows a third exemplary embodiment of the device according to the invention. It differs from the example in FIG. 3 in that not only the one exhaust gas duct 35 and the additional process gas feed 43 open into the branch chamber 41, but that a further exhaust gas duct 71 opens into the branch chamber 41. Like the process gas duct 43, the main part of the additional exhaust gas duct 71 extends inside the extrusion head 13 in parallel to the filling mandrel 1 and exits at an exhaust gas outlet 73 in the housing section 37. A device generating negative pressure, which is not shown, is connected to the exhaust gas outlet 73, for the controlled extraction and adjustment of a desired pressure level at which in operation a quantity of sample gas is available for analysis at the exhaust gas outlet 39. At the same time, the additional process gas introduced provides for the stable guide of the hose 19 enclosing the chamber 29.

The designs in accordance with the invention also permit significantly higher gas flow rates compared to the supporting air used exclusively in the state of the art. In this way, the flow profile inside the hose 29 can be specifically adjusted. This arrangement is advantageously useable for the described analytical purposes, for efficiently rinsing the interior of the hose 29 or for fine-tuning the temperature of the inner hose surface. This advantageous use is achieved by pre-heating/-cooling the supplied sterile process gas and adjusting its flow rate and flow velocity and is important for the safe sealing of the filled containers by welding.

Increased gas flow rates, aerosols or explosive vapors of the filling material, which can occur during the filling process, for instance, can be reliably and directly removed and can be optionally detected and analyzed by a measuring instrument at the exhaust outlet 39.

Furthermore, the versions according to the invention permit a simultaneous and selective use of different and/or differently conditioned process gases. For instance, in products that can form explosive mixtures, only air can be supplied via the feed 21 and simultaneously an inert gas (optionally pre-tempered, such as nitrogen, carbon dioxide or argon) can be supplied via the feeds 43. This ability ensures explosion protection on the one hand and reduces the demand for inert gas on the other, resulting in lower production costs.

While various embodiments have been chosen to illustrate the invention, it will be understood by those skilled in the art that various changes and modifications can be made therein without departing from the scope of the invention as defined in the claims.

The invention claimed is:

1. A device for producing and filling containers, the device comprising:
    a plasticized plastic material extruder with an annular extrusion nozzle extruding a hose from the annular extrusion nozzle in an extrusion head of the extruder;
    a mold movable between an open position receiving the hose, a molding position forming an open container and a closed position sealing the container closed;
    a hose guide guiding the hose between the extrusion head and the mold;
    a filling mandrel longitudinally movable in the extrusion head to a functional position inside the open container to introduce filling material into the open container;
    a first process gas feeder conveying a process gas into an interior of the hose and having a first guide duct extending inside the extrusion head and outside of the filling mandrel; and
    a first exhaust gas duct extending in the extrusion head, being spaced from the first guide duct, and discharging the process gas from the interior of the hose,
    wherein the first exhaust gas duct opens into the interior of the hose and extends through the extrusion head parallel to the filling mandrel.

2. The device according to claim 1, wherein
the first process gas feeder supplies pre-tempered process gas.

3. The device according to claim 1, wherein
a second exhaust gas duct extends in the extrusion head, is spaced from the first guide duct and the first exhaust duct, and discharges the process gas from the interior of the hose.

4. The device according to claim 3, wherein
a number of exhaust gas ducts exceeds a number of guide ducts in the extrusion head by at least one.

5. The device according to claim 1, wherein
a controllable vacuum-generating device is connected to the first exhaust gas duct.

6. The device according to claim 1, wherein
a physical or chemical analysis measuring device is connected to the first exhaust gas duct.

7. The device according to claim 1, wherein
a particle measurer is connected to the first exhaust gas duct.

8. The device according to claim 1, wherein
a branch chamber is in the extrusion head and is in fluid communication with the first guide duct such that an at least partial flow of the process gas enters from the branch chamber into the first guide duct, the first guide duct extending at least partially between the filling mandrel and a support housing in which the filling mandrel is guided in a longitudinally displaceable manner, the at least partial flow of the process gas exiting via functional ducts extending in the support housing and preventing entry of ambient air by blocking.

9. The device according to claim 1, wherein
one end of the first exhaust gas duct opens into a branch chamber in the extrusion head, the filling mandrel extending through the extrusion head and into the interior of the hose with the process gas in the interior of the hose.

10. The device according to claim 3, wherein
ends of the first and second exhaust gas ducts open into opposite sides of a branch chamber in the extrusion head.

11. The device according to claim 1, wherein
the first exhaust gas duct opens laterally into a branch chamber in the extrusion head.

12. The device according to claim 1, wherein
the first exhaust gas duct has a first end connected to a regulable, vacuum-generator and has a second end opening into a branch chamber in the extrusion head laterally and in parallel to the first guide duct.

13. A device for producing and filling containers, the device comprising:
    a plasticized plastic material extruder extruding a hose from an extrusion head of the extruder;
    a mold movable between an open position receiving the hose, a molding position forming an open container and a closed position sealing the container closed;
    a hose guide guiding the hose between the extrusion head and the mold;

a filling mandrel longitudinally movable in the extrusion head to a functional position inside the open container to introduce filling material into the open container;

a first process gas feeder duct in the extrusion head adjacent to an interior surface of the hose and adjacent to at least one exit point of the hose from the extrusion head, the first process gas feeder duct conveying a process gas into the hose along the interior surface of the hose; and a first exhaust gas duct extending in the extrusion head, being spaced from the first process gas feeder duct, and discharging the process gas from an interior of the hose, wherein the first exhaust gas duct opens into the interior of the hose and extends through the extrusion head parallel to the filling mandrel.

14. The device according to claim 13, further comprising a second process gas feeder duct in the extrusion head adjacent to the interior surface of the hose and adjacent to at least one exit point of the hose from the extrusion head, the second process gas feeder duct conveying the process gas into the hose along the interior surface of the hose.

15. The device according to claim 14, wherein different first and second process gases are conveyed into the interior of the hose via the first and second process gas feeder ducts, respectively.

16. The device according to claim 15, wherein:
the first process gas is air; and
the second process gas is an inert gas.

17. The device according to claim 1, further comprising a second process gas feeder with a second guide duct in the extrusion head with an opening adjacent the annular extrusion nozzle conveying the process gas into the interior of the hose simultaneously with the first guide duct and close to an interior surface of the hose adjacent the annular extrusion nozzle.

18. The device according to claim 17, wherein different first and second process gases are introduced in the interior of the hose via the first and second guide ducts, respectively.

19. The device according to claim 18, wherein:
the first process gas is air; and
the second process gas is an inert gas.

\* \* \* \* \*